United States Patent [19]

Sharp

[11] Patent Number: 4,867,776
[45] Date of Patent: Sep. 19, 1989

[54] APPARATUS FOR AND METHOD OF FORMING INTEGRAL LENSES ON OPTICAL FIBERS

[75] Inventor: David P. Sharp, Houston, Tex.

[73] Assignee: Compaq Computer Corporation, Houston, Tex.

[21] Appl. No.: 189,295

[22] Filed: May 2, 1988

[51] Int. Cl.[4] ............................................. C03B 37/10
[52] U.S. Cl. .......................................... 65/2; 65/11.1; 65/142; 65/285; 264/1.5; 264/2.1
[58] Field of Search ................... 65/2, 11.1, 63–65, 65/21.1, 21.5, 38, 142, 285; 264/1.5, 2.1

[56] References Cited

U.S. PATENT DOCUMENTS

| | | | |
|---|---|---|---|
| 2,272,342 | 2/1942 | Hyde | 65/21.5 |
| 2,429,692 | 10/1947 | Joyce | 264/2.1 X |
| 2,517,661 | 8/1950 | Hart | 65/21.1 X |
| 2,551,279 | 5/1951 | Miller | 65/64 |
| 4,159,863 | 7/1979 | Stewart | 350/96.18 |
| 4,191,447 | 3/1980 | Borsuk | 350/96.20 |
| 4,290,667 | 9/1981 | Chown | 350/96.18 |
| 4,427,879 | 1/1984 | Becher, et al. | 250/215 |
| 4,510,005 | 4/1985 | Nijman | 65/11.1 X |
| 4,758,386 | 7/1988 | Fanning | 264/1.5 |

*Primary Examiner*—Robert L. Lindsay
*Attorney, Agent, or Firm*—Pravel, Gambrell, Hewitt, Kimball & Krieger

[57] ABSTRACT

Apparatus and method for forming an integral structure, such as a lens, on a fiber, such as an optical fiber, which includes a device which imparts centrifugal force to an end of the fiber while the end of the fiber is being heated. An arc or heat source which heats the end of the fiber can both rotate about the longitudinal axis of the fiber and move laterally with respect to the longitudinal axis of the fiber. The apparatus also includes a device for longitudinally moving the fiber relative to the arc. When a fiber is inserted into the apparatus, centrifugal force is exerted on the end of the fiber as the fiber is heated. The fiber is advanced longitudinally relative to the arc until a sphere of a predetermined size is formed. Then, depending upon the shape or lens desired, the sphere may be allowed to cool and be removed from the apparatus, or other operations are performed.

20 Claims, 4 Drawing Sheets

APPARATUS FOR AND METHOD OF FORMING INTEGRAL LENSES ON OPTICAL FIBERS

BACKGROUND OF THE INVENTION

1. Field of the Invention

The present invention relates to an apparatus for and methods of forming structures on glass or plastic fibers, and more particularly to forming lenses on optical fibers.

2. Description of the Related Art

When coupling optical fibers with other optical fibers or light-producing or light-responsive elements, it is customary to provide lenses for, for example, refracting light carried by the fiber into a larger parallel beam (when the end of the fiber is emitting light) and for refracting a relatively large beam of light into a beam which is sufficiently small to be carried by the fiber (when the end of the fiber is receiving light). These lenses increase the effective area of transmission or reception of the optical fibers, thereby reducing the ratio between the lateral misalignment and the effective area of transmission or reception, thereby making the fiber's connection less sensitive to lateral misalignment.

Additionally, lenses are preferably used on optical fibers for focusing light on surfaces, such as optical disks, and for receiving light reflected from a source, such as an optical disk. The lenses are used to provide the sharp focus necessary to accurately impinge on the track of an optical disk and to collect the scattered or reflected light from the disk surface.

Various means have been used or proposed to couple lenses to the optical fibers, generally involving complicated support structures, special materials, precision finishing, or additional processing steps, which often result in insertion losses and added costs. For example, in U.S. Pat. No. 4,290,667, the optical fiber is glued to a structure which comprises a lens. In U.S. Pat. No. 4,159,863, a well is formed in an end of an optical fiber, then a lens is formed in the well or is glued or otherwise bonded to the fiber.

U.S. Pat. Nos. 4,191,447 and 4,427,879 disclose methods of forming integral lenses on optical fibers by the simple heating of an end of the optical fiber. Heat is applied to the fiber end by flames, soldering irons, or other means and a simple meniscus or spherical shape is obtained. However, there is no way to carefully control the shape of the resulting fiber end, so that low quality lenses may be formed because of localized heating, contaminants, imperfections, gravity and other factors. The shape of the lenses formed by these methods is thus limited and cannot be used in critical or special applications without a high amount of waste or further processing.

SUMMARY OF THE INVENTION

The invention includes a method and apparatus for integrally forming a lens or shape on the end of a fiber, preferably an optical fiber. A series of three electrical motors and a solenoid are used in combination with an electric arc to melt and shape the end of the fiber.

One motor, a centrifuge motor, is used to spin or rotate the apparatus to produce a force parallel to the longitudinal axis of the fiber. A second motor, an arc rotational motor, is used to rotate the arc about the fiber end to produce a uniform heating about the end. A third motor is used to advance or retract the end longitudinally with respect to the arc. The solenoid is used to move the arc laterally away from the longitudinal axis of the fiber.

To produce a lens or shape on the end of a fiber, the centrifuge motor, the arc rotational motor and the arc are started. The third, advancing motor advances the fiber end into the arc and the end begins to melt, preferably, in an inert gas environment to prevent contamination of the fiber. A molten ball of sufficient size is formed by having the advance motor advance the fiber into the arc. Once sufficient molten material is present, the motors, solenoid and arc, are controlled to develop the desired lens or shape. The speed of the centrifugal motor can be increased to produce an ellipsoidal shape or the arc can be moved off center to allow a concave shape to be formed. Other control variations can be used to develop alternate lens shapes.

This description is intended as a brief summary only. The claims are intended to describe the scope of the invention convered.

BRIEF DESCRIPTION OF THE DRAWINGS

For a further understanding of the nature, objects, and advantages of the present invention, reference should be had to the following detailed description, taken in conjuction with the accompanying drawings, in which like reference numerals denote like elements, and wherein.

DETAILED DESCRIPTION OF THE PREFERRED EMBODIMENT

Figure 1:
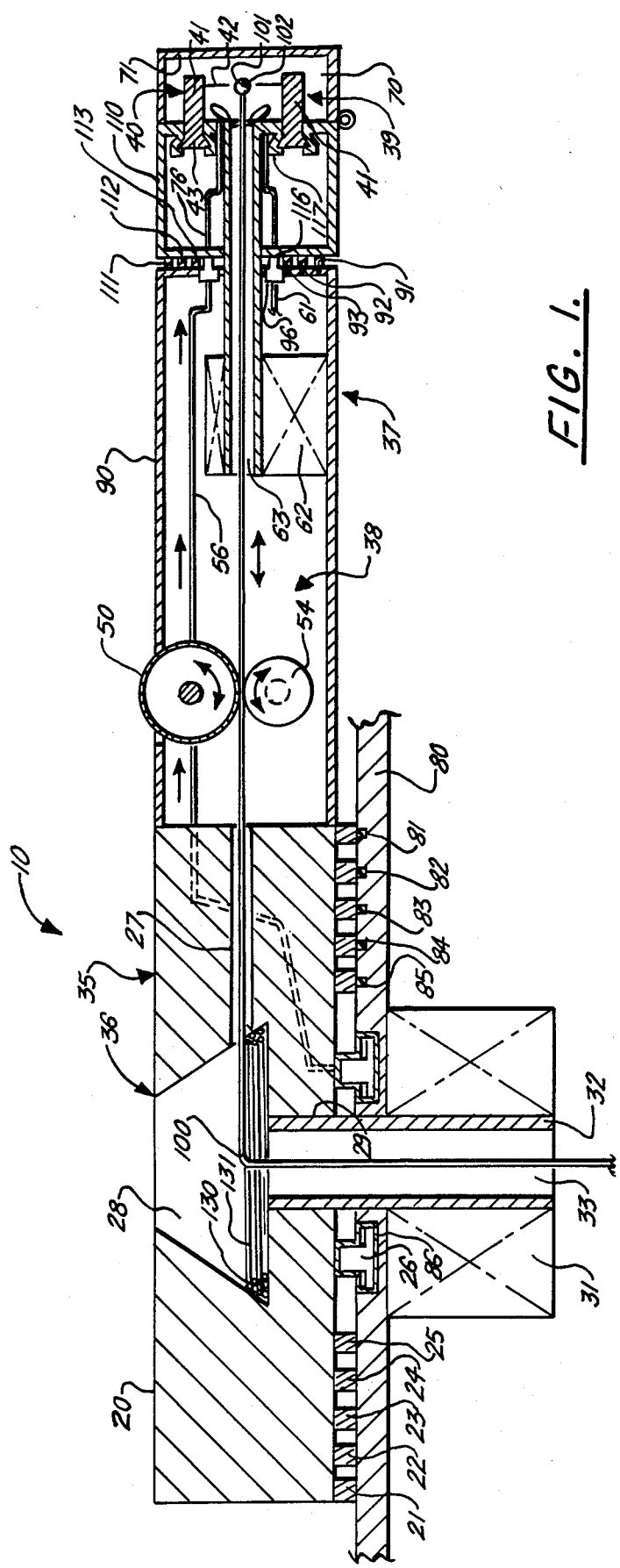
FIG. 1 is a cross-sectional view of the apparatus of the preferred embodiment of the present invention. taken along the lines 1—1 in FIG. 2.
Figure 3:
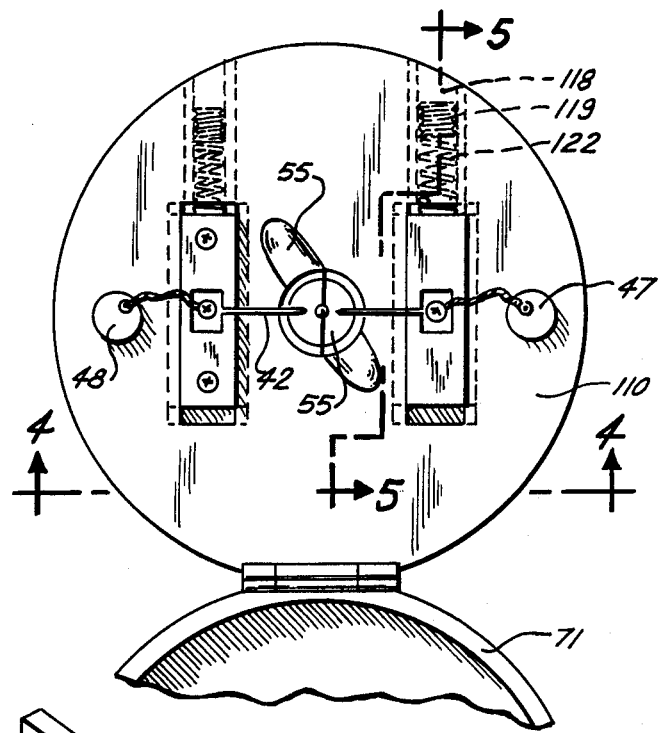
FIG. 3 is an end view of the apparatus shown in FIGS. 1 and 2.
Figure 2:
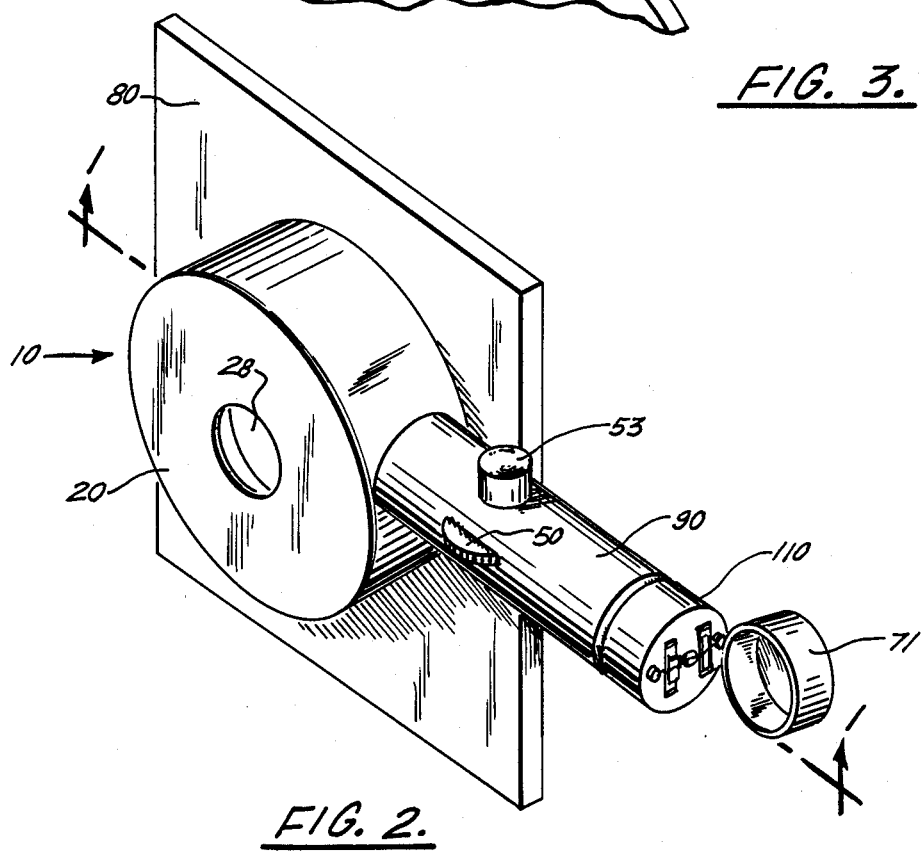
FIG. 2 is a perspective view of the apparatus of the preferred embodiment of the present invention.
Figure 4:
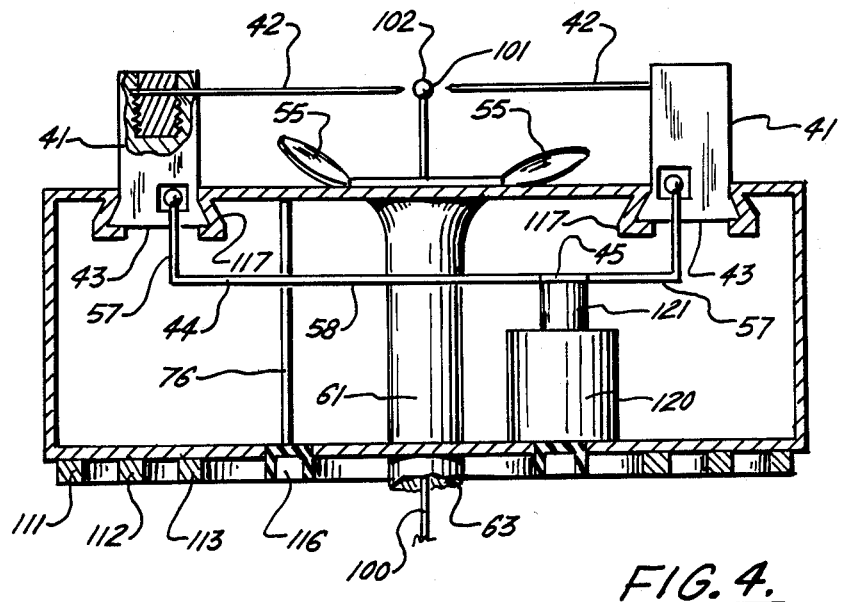
FIG. 4 is a cross-sectional detail of the apparatus shown in FIGS. 1 and 2, taken along the lines 4—4 in FIG. 3.
Figure 5:
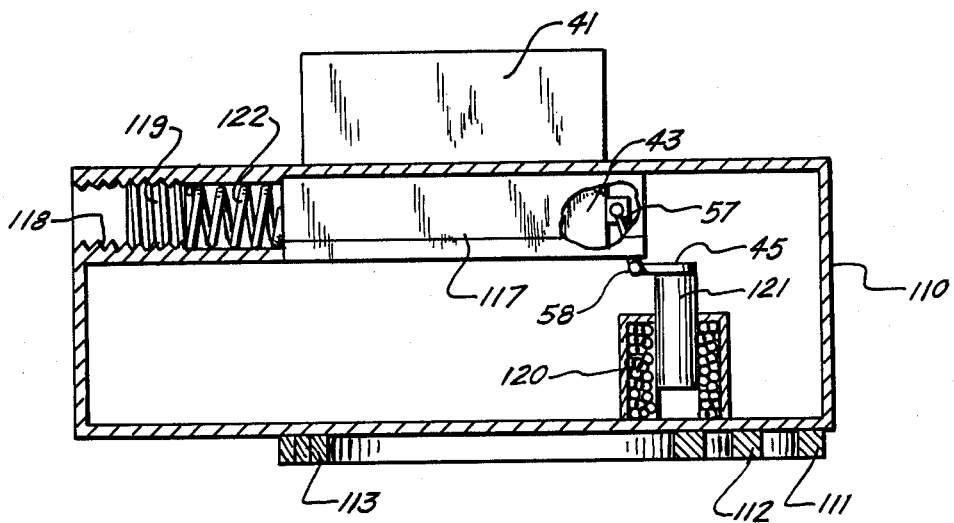
FIG. 5 is a cross-sectional detail of the apparatus of the preferred embodiment of the present invention, taken along lines 5—5 in FIG. 3.

The preferred embodiment of the apparatus of the present invention, apparatus 10, is shown in FIGS. 1–5. Referring to FIG. 1, apparatus 10 is a means for imparting various centrifugal forces to an end of a fiber, preferably an optical fiber 100, and includes a drum 20 and a centrifuge motor 31 which are interconnected by a shaft 32 having a bore 33 therethrough. Apparatus 10 also includes a heating means 39, preferably including a high voltage arc 40; a portion for advancing the fiber 100 into and retracting the fiber from the heating means 39, including an advancing motor 53 (FIG. 2) and a thumbwheel 50; and a rotational means 37 for rotating the heating means 39 about the longitudinal axis of the fiber 100, the rotational means 37 including a rotational motor 62. Apparatus 10 further preferably includes a gas chamber 70 within which portions of the heating means 39 including the high voltage arc 40 are disposed, the chamber 70 being closable with a cap 71.

The centrifuge motor 31 is fixedly attached to a board or platform 80 which may be part of or attached to, for example, a table. The drum 20 has a vertical bore 29 through the center thereof, with the shaft 32 of the centrifuge motor 31 disposed in bore 29. The drum 20 has a transverse bore 27 leading from a central well 28 to the exterior of the drum 20 allowing the optical fiber 100 to pass to the remaining portions of the apparatus 10. The central well 28 preferably has a conical shape with the narrow end 36 opening on the drum face 35 opposite the centrifuge motor 31 so that an optical fiber 130 coiled in the central well 28 does not have a tendency to escape from the central well 28 when the drum 20 is rotated.

The drum 20 has a first set of electrically conductive slip rings 21, 22, 23, 24 and 25 and a first hollow, open-bottom slip ring 26 attached to the bottom thereof. The electrical slip rings 21–25 are used to conduct electrical signals whose function will be described in further detail, while hollow slip ring 26 is used to allow transmission of an inert gas whose use will be described in further detail. The electrical rings 21–25 are in electrical contact with corresponding brushes 81, 82, 83, 84 and 85, disposed in the board 80. The hollow slip ring 26 is in gas-flow contact with, and may freely rotate with respect to, a first hollow ring 86 disposed in the board 80. The hollow ring 86 has an open top to allow it to communicate with the hollow slip ring 26.

The rotational motor 62 is fixedly attached to the interior of a spinning housing 90, the spinning housing 90 being fixedly attached to the outer surface or periphery of the drum 20 so that the spinning housing 90 is spun about the drum 20 central axis when the centrifuge motor 31 rotates. A rotational shaft 61 interconnects the rotational motor 62 and a revolving housing 110. The rotational shaft 61 fixedly attached to the revolving housing 110 so that when the rotational motor 62 rotates, the revolving housing 110 revolves about its central axis. The rotational shaft 61 is preferably hollow with a bore 63, and extends from spinning housing 90 into a heating chamber 70 where the optical fiber 100 is heated.

A second set of electrically conductive slip rings 111, 112, and 113 are fixedly attached to the revolving housing 110, and are in electrical contact with a second set of brushed 91, 92 and 93, respectively, which are disposed on or in the spinning housing 90, for communication of various electrical signals. A second hollow slip ring 116 is attached to the revolving housing 110, and is in gas-flow contact with a second hollow ring 96 attached to the spinning housing 90 for transmission of the inert gas.

A first gas conduit 56 interconnects the first hollow slip ring 26 with the second hollow ring 96. A second gas conduit 76 interconnects the second hollow slip ring 116 and the heating chamber 70. A third gas conduit (not shown) connects the first hollow ring 86 with a supply of inert gas such as argon or nitrogen.

The advancing motor 53 (FIG. 2) has a drive wheel 54 (FIG. 1) disposed on an end thereof. The drive wheel 54, and a thumbwheel 50 for manual use, are made of or coated with a pliable synthetic rubber or other material which allows the wheels 54 and 50 to firmly grip the fiber 100, yet yields enough to allow a larger diameter structure to pass therebetween and does not scratch or mar the fiber 100 surface. The advancing motor 53 is preferably a reversible motor so that the fiber 100 can be advanced into or retracted from the heating chamber 70 as desired.

Centering tabs 55 (FIGS. 3 and 4) are disposed in the end of the bore 63 of shaft 61, and serve to releasably center the optical fiber 100 in the bore 63. The centering tabs 55 are sufficiently flexible so that various diameters of optical fibers 100 can be utilized and so that the fiber 100 can be advanced, retracted, or rotated without marring or damaging the finish of the fiber 100 or breaking the fiber 100. The centering tabs 55 can be manually operated or can be modified and connected to other devices to allow automatic operation.

A high voltage arc apparatus 40 is located in the heating chamber 70 and includes two electrode heads 41, each electrode head 41 having a pin 42 extending outwardly therefrom so that the pins 42 are separated by a gap across which an arc is formed. The electrode heads 41 each preferably have a dovetail-shaped foot portion 43 (FIG. 4) which is mounted in and slidably engaged with a rail 117 in the revolving housing 110 to allow positive positioning of the pins 42 with respect to the distance from the end of the rotational shaft 61 and yet allow the pins 42 to be moved laterally with respect to the fiber 100 longitudinal axis.

A U-shaped bar 44 interconnects the two electrode heads 41. The U-shaped bar 44 includes two legs 57 connected by a straight bar 58. The legs 57 are pivotally connected to the foot portion 43 of each electrode head 41 by a pinned joint so that the leg 57 can pivot with respect to the electrode head 41 but not move laterally with respect to the head. The foot portion 44 is pivotally connected by means of a pinned joint to a plate 45 which is rigidly attached to a plunger 121 of a solenoid or linear motor 120 or other means of providing a variable, controlled linear motion. The solenoid 120 is itself fixedly attached to the revolving housing 110.

The revolving housing 110 has a threaded bore 118 (FIG. 5) aligned with the slidable direction of the foot portion 43 of each electrode head 41. A screw 119 and a tension spring 122 are disposed in each bore 118 so that the spring 122 biases the electrode head 41, with the screw 119 being used to adjust the zero position of the electrode head 41 by changing the position of the spring 122. Preferably, the screws 119 are adjusted such that when no current flows through the solenoid 120, the longitudinal axes of pins 42 are perpendicular to and intersect the longitudinal axis of fiber 100. In this manner, retracting the solenoid 120 causes the electrode heads 41 to be displaced laterally from the fiber 100 with the springs 122 allowing a smooth movement.

Wires (not shown) or other suitable conductive means electrically connect slip rings 24 and 25 to the advancing motor 53 and the rotational motor 62 to transmit motor control signals from controlling circuitry (not shown) to the motors. Slip rings 21, 22 and 23 are electrically connected to brushes 91, 92 and 93, respectively, with brush 93 being connected with slip ring 113, which is connected to solenoid 120 to transmit a control signal to the solenoid 120. Slip rings 111 and 112 are electrically connected to high voltage terminals 47 and 48 (FIG. 3), respectively, which in turn are connected to the pins 42 to provide the signal necessary to develop the arc.

The various motors 31, 53, and 62, the solenoid 120, the high voltage arc 40, and the gas supply means (not shown) may be controlled by manual switches. Preferably, however, they are controlled by a microcomputer or other computer-based system, by coupling the gas supply means, motor 31, and slip rings 81-85 to switching means controlled by the microcomputer or other computer-based system. The use of computers allows more repeatable and accurate control of the apparatus 10, allowing uniform shapes to be formed on the fiber 100.

The control exercised by the computer can be of an open loop form or can be closed loop. In open loop form, the computer simply activates the various motors, the solenoid 120 and the arc 40 in a programmed sequence, with no feedback of the actual qualities of the lens being formed. In closed loop form, a light can be transmitted along the fiber 100, reflected in the heating chamber 70 and returned along the fiber 100. This returned signal can be analyzed to allow determination of the shape formed on the fiber 100, with appropriate changes to the various control signals made as necessary to develop the desired shape.

Alternately in a closed loop form, the light can be transmitted by the fiber 100 to a receiver located in the heating chamber 70, with this receiver being linked to the control system, or a light can be transmitted to the fiber 100 and the signal produced by the fiber 100 analyzed by the control system to allow optimal design and production of the shape or lens on the fiber 100. In addition, combinations of open and closed loop control can be utilized during different portions of the operation.

In operation, the cap 71 is opened to allow an operator access to the heating chamber 70 if desired and if manual alignment of the fiber 100 is utilized. A first end 102 of the fiber 100 is inserted through the bore 33 in the centrifuge motor shaft 32 and then through the bore 27 in the drum 20. When the fiber is short enough to coil up inside the well 28, the fiber 100 can be coiled in the well 28 and the end 102 can be inserted directly into the bore 27 in the drum 20. The fiber 100 is advanced until it contacts the wheels 50 and 54 which are rotated from the outside housing 90 manually or turned by the advancing motor 53, as appropriate, to cause the fiber 100 to advance further until its first end 102 is adjacent the pins 42 of the electric arc 40. The cap 71 is then closed, and the inert gas is caused to flow from a gas source (not shown) through the hollow ring 86 to the gas slip ring 26, through conduit 56 to the hollow ring 96 to the slip ring 116 into the conduit 76, and through the conduit 76 into the heating chamber 70. The centrifuge motor 31 is then turned on, causing the drum 20, the spinning housing 90 and the revolving housing 110 to rotate in a plane parallel to the board 80 and about the drum axis, imparting a centrifugal force to the first end 102 of fiber 100, the force being aligned with the longitudinal axis of the fiber 100. The rotational motor 62 is then turned on, causing the revolving housing 110, and the high voltage arc 40 disposed therein, to rotate about the longitudinal axis of fiber 100, providing uniform heating about the end 102.

An electric current is supplied to the high voltage terminals 47 and 48, causing an arc to flow from one pin 42 to the other, which causes the end 102 of the fiber 100 to heat up if the end 102 is sufficiently close to the arc. As the heat applied to the end 102 causes the end 102 to melt, the advancing motor 53 is turned on, causing the drive wheel 54 to rotate, which causes the fiber 100 to advance longitudinally through the bore 63 of the shaft 61 of the rotational motor 62.

When a sphere 101 of a desired size is formed on the first end 102 of the fiber 100, the size being determined by the size of the fiber 100 and by the amount of time fiber 100 has been heated and advanced in an open loop circumstances, or by viewing the first end 102 of the fiber 100 in a closed loop circumstance, and a roughly spherically shaped ball has been formed, the various motors 31, 53, and 62 and the solenoid 120 are controlled to move the end 102 as necessary to produce the desired lens or shape by moving the end into and out of the arc and varying the various centrifugal forces to cause the molten material to solidify or flow where desired.

For example, if a spherical lens or shape is desired, the high voltage arc 40 can be shut off, the rotational and advancing motors 62, 53 stopped and the centrifuge motor 31 controlled until the end 102 solidifies. Once the end 102 has cooled enough to solidify, the centrifuge motor 31 is shut off, gas flow in the heating chamber 70 is stopped, and the fiber 100 is removed from apparatus 10. The fiber 100 can be removed by opening the cap 71 and pulling the fiber 100 out, so that its second end follows the path first end 102 took in entering apparatus 10 or the end 102 by retracting in a manner opposite to its insertion. As mentioned before, the material making up the wheels 50 and 54 is preferably sufficiently resilient to yield when the sphere 101 passes between the wheels 50 and 54, so that the sphere 101 does not become damaged. Alternatively, the thumb wheel 50 could be made vertically adjustable so that it could be moved out of the way when it is desired to pass the sphere 101 between the wheels 50 and 54.

Figure 6:
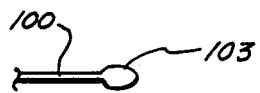
FIG. 6 is a side view of an optical fiber having an integral ellipsoidal lens formed on a first end thereof by the apparatus and method of the present invention.

If the desired end product is something other than a spherically-shaped lens, the procedure, once a melted ball of the desired size is formed, is somewhat different. If, for example, it is desired to form an ellipsoidal lens 103 (FIG. 6), once a molten sphere 101 is formed, the speed of the centrifuge motor 31 is increased, increasing the amount of longitudinal centrifugal force exerted on sphere 101. The arc 40 remains on and heating the end 102 until an ellipsoidal lens 102 is formed from the flowing, molten material. The arc 40 and the rotational and advancing motors 62, 53 are then shut off, and the speed of the centrifuge motor 31 is maintained until the lens 103 is hardened. The centrifuge motor 31 is then shut off, gas flow into the heating chamber 70 is stopped, and the fiber 100 is removed from the apparatus 10.

Figure 7:
FIG. 7 is a cross-sectional view of an optical fiber having an integral concave lens formed thereon by the apparatus and method of the present invention.
Figure 8:
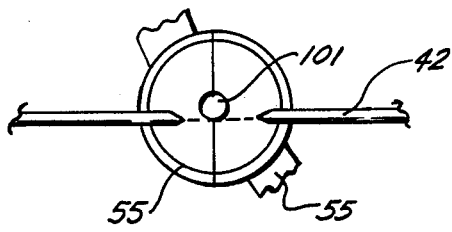
FIG. 8 is an end view of the apparatus of the present invention, showing the method of forming the lens shown in FIG. 7.

When a concave lens 104 (FIG. 7) is desired, the centrifuge motor 31 is sped up and the arc 40 is moved away from the longitudinal axis of the fiber 100. The solenoid 120 is activated, causing the plunger 121 to be retracted into the solenoid 120. This movement of the plunger 121 pulls the straight bar 58 of the U-shaped bar 44 downward, and causes the legs 57 of the U-shaped bar 44 to become more vertically oriented. This causes the electrode heads 41 and the pins 42 to move laterally away from the longitudinal axis of the fiber 100 and toward the outer edge of the end 102. This removal of the arc from the center of the end 102 allows the center to solidify and the edges to remain molten. The longitudinal centrifugal force causes the edges of the end to continue to extend, resulting in a concave shape 104. When the desired shape is formed, the arc 40 is shut off, and the speeds of the centrifuge motor 31 and the rotational motor 62 are maintained until the lens 104 hardens. The centrifuge motor 31, the rotational motor 62 and the flow of gas are then shut off, and the fiber 100 is removed from apparatus 10.

Figure 9:
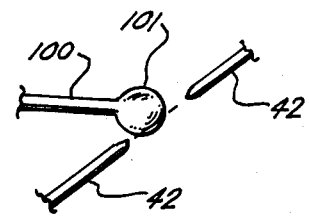
FIG. 9 is a detail of a step in a method of forming a Fresnel lens using the apparatus of the present invention.
Figure 10:
FIG. 10 is a cross-sectional view of an optical fiber after the step shown in FIG. 9 has been performed.
Figure 11:
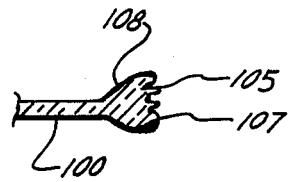
FIG. 11 is a cross-sectional view of an optical fiber having a Fresnel lens, on an end thereof, formed by the apparatus and method of the present invention.

When it is desired to make, for example, a multiply ringed or a Fresnel lens 108 (FIG. 11), the sphere 101 is moved by the advancing motor 53, and pins 42 are moved by the solenoid 120, so that the arc passes through the edge of sphere 101 at a position forward of the equator, that is, on the opposite side of the equator of sphere 101 from the unaltered portion of fiber 100, and offset from the longitudinal axis of fiber 100 (FIG. 9). The speed of centrifugal motor 31 is increased. The portions of the sphere 101 closer to the longitudinal axis harden and the portions under the arc 40 remain molten. When the first projection 105 (FIG. 10) is formed by the longitudinal centrifugal force, the arc is shut off and the projection 105 cools and solidifies. The fiber 100 and the pins 42 are then manipulated such that the arc passes through the edge of the modified sphere 106 at a position closer to the equator of sphere 106. The arc 40 is then turned on, and remains on until a second projection 107 is formed, at which time the arc 40 is shut off and the second projection 107 solidifies. This process is repeated until the desired number of projections or gratings of the Fresnel lens 108 are formed.

The foregoing are only examples of several lenses or shapes that can be formed on the end 102. Various other shapes can be formed by appropriately controlling, varying and alternating the speeds of the various motors 31, 53, 62, the position of the solenoid 120 and the activation of the arc 40 in cooperation, so that the viscosity and surface tension and thermal mass and conductivity of the material can be controlled and used as necessary and appropriate to develop the desired shapes, as will be apparent to those skilled in the art. Additionally, a second lens can be formed on each end of the fiber 100.

Optical fibers having integral lenses formed thereon by the apparatus and method of the present invention can be used, for example, in optical disk drive heads, medical imagery, and telephone splices and other uses in which an optical fiber having an integrally formed lens is an improvement over multiple piece elements and lenses.

While the above examples involve forming an integral lens on an optical fiber, the present invention can be used to form integral structures on other types of fibers.

In view of the numerous modifications which could be made to the preferred embodiments disclosed herein without departing from the scope or spirit of the present invention, the details herein are to be interpreted as illustrative and not in a limiting sense.

I claim:

1. An apparatus for forming an integral structure on a first end of a fiber, the fiber having a longitudinal axis, comprising:
   heating means for heating the first end of the fiber to develop a molten portion of the fiber; and
   means for imparting centrifugal force parallel to the longitudinal axis of the fiber to the first end of fiber to cause the molten portion to flow.
2. The apparatus of claim 1, further comprising:
   means for evenly heating the first end of the fiber.
3. The apparatus of claim 2, wherein said even heating means includes means for rotating said heating means about the longitudinal axis of the fiber.
4. The apparatus of claim 1, further comprising:
   means for longitudinally moving the fiber relative to said heating means.
5. The apparatus of claim 4, further comprising:
   means for rotating said heating means about the longitudinal axis of the fiber.
6. The apparatus of claim 1, further comprising:
   means for laterally moving said heating means relative to the longitudinal axis of the fiber.
7. The apparatus of claim 1, further comprising:
   a chamber in which said heating means is disposed; and
   supply means for allowing supply of a gas to said chamber
8. The apparatus of claim 1, further comprising:
   means for moving said heat laterally relative to the longitudinal axis of fiber between a plurality of positions.
9. The apparatus of claim 8, further comprising:
   means for longitudinally moving the fiber relative to said heating means.
10. The apparatus of claim 9, further comprising:
    means for rotating said heating means about the longitudinal axis of the fiber.
11. The apparatus of claim 8, furtnar comprising:
    means for rotating said heating means about the longitudinal axis of the fiber.
12. An apparatus for forming an integral structure on a first end of a fiber, the fiber having a longitudinal axis, comprising:
    heating means for heating the first end of the fiber to develop a molten portion of the fiber;
    means for imparting centrifugal force to the first end of the fiber to cause the molten portion to flow;
    means for longitudinally moving the fiber relative to said heating means;
    means for rotating said heating means about the longitudinal axis of the fiber; and
    means for laterally moving said heating means relative to he longitudinal axis of the fiber.
13. The apparatus of claim 12, further comprising:
    a chamber in which said heating means is disposed; and
    supply means for supplying inert gas to said chamber.
14. The apparatus of claim 13, wherein said means for laterally moving said heating means relative to the longitudinal axis of the fiber includes means for laterally moving said heating means between a plurality of positions relative to the longitudinal axis of the fiber.
15. A method of forming an integral structure on a first end of a fiber, the fiber having a longitudinal axis, comprising the following steps:
    (a) heating the first end of the fiber to develop a molten portion of the fiber; and
    (b) imparting centrifugal force parallel to the longitudinal axis of the fiber to the first end of the fiber to cause the molten portion to flow.
16. The method of claim 15, wherein:
    sufficient centrifugal force is exerted on the first end of the fiber as the fiber is being heating such that a substantially ellipsoidal shape is formed at the first end of the fiber.
17. The method of claim 15, further comprising the step of:

advancing the fiber in the direction of the centrifugal force until a ball of a predetermined size is formed on the first end of the fiber.

18. The method of claim 17, further comprising the step of:

heating the side of said ball until a concave shape is formed.

19. The method of claim 17, further comprising the step of:

forming a multiply ringed shape by heating various portions of said sphere for various periods of time.

20. The method of claim 17, further comprising the step of:

heating the side of said ball to allow portions of said ball to be solid and other portions of said ball to be molten.

* * * * *

UNITED STATES PATENT AND TRADEMARK OFFICE
CERTIFICATE OF CORRECTION

PATENT NO. : 4,867,776

DATED : September 19, 1989

INVENTOR(S) : David P. Sharp

It is certified that error appears in the above-identified patent and that said Letters Patent is hereby corrected as shown below:

At Col. 7, Line 65, before the second occurrence of "fiber" please add --the--.

At Col. 8, Line 19, please replace "heat" with --heating means--.

At Col. 8, Line 20, before the occurence of "fiber" please add --the--.

At Col. 8, Line 44, please replace "he" with --the--.

Signed and Sealed this

Fourteenth Day of August, 1990

Attest:

HARRY F. MANBECK, JR.

*Attesting Officer*      *Commissioner of Patents and Trademarks*